(12) United States Patent  
Beistle et al.

(10) Patent No.: US 7,820,943 B2
(45) Date of Patent: Oct. 26, 2010

(54) STICK ARC WELDER WITH LOW VOLTAGE START

(75) Inventors: Edward Beistle, Appleton, WI (US); Todd G. Batzler, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1108 days.

(21) Appl. No.: 10/906,378

(22) Filed: Feb. 17, 2005

(65) Prior Publication Data

US 2006/0076330 A1   Apr. 13, 2006

Related U.S. Application Data

(60) Provisional application No. 60/522,522, filed on Oct. 8, 2004.

(51) Int. Cl.
  *B23K 9/06* (2006.01)
(52) U.S. Cl. ............ 219/130.4; 219/130.1; 219/130.21; 219/130.31
(58) Field of Classification Search ............ 219/130.21, 219/130.31, 130.32, 130.33, 137 PS
   See application file for complete search history.

(56) References Cited

U.S. PATENT DOCUMENTS 3,904,846 A * 9/1975 Risberg ................. 219/130.33
5,270,516 A * 12/1993 Hamamoto et al. .... 219/130.33
5,734,147 A * 3/1998 Bunker et al. .......... 219/130.33
5,783,799 A * 7/1998 Geissler ................. 219/137 PS
6,023,046 A * 2/2000 Holverson et al. ..... 219/137 PS
6,034,350 A * 3/2000 Heraly et al. ............ 219/130.4
6,548,784 B2  4/2003 Sammons et al. ........... 219/132
2002/0053560 A1* 5/2002 Bunker et al. ................ 219/133
2002/0144989 A1* 10/2002 Sammons et al. ...... 219/137 PS
2003/0080101 A1* 5/2003 Flood et al. ............ 219/130.21
2004/0099649 A1  5/2004 DeCoster

FOREIGN PATENT DOCUMENTS

EP       0667205 A1   8/1995
JP       61003672     1/1986

* cited by examiner

*Primary Examiner*—Stephen J Ralis
(74) *Attorney, Agent, or Firm*—Fletcher Yoder P.C.

(57) ABSTRACT

A system and method for forming an arc between an electrode and a workpiece is disclosed. The present invention includes a method of initiating an arc that includes comparing voltage across output terminals of a stick welder to a voltage threshold, and if the voltage across the output terminals is less than the voltage threshold, increasing the voltage across the output terminals to an arc formation OCV. The output voltage of the stick welder will be driven to a lower OCV if an arc is not formed between an electrode and a workpiece within a given period of time.

12 Claims, 7 Drawing Sheets

STICK ARC WELDER WITH LOW VOLTAGE START

CROSS-REFERENCE TO RELATED APPLICATION

The present invention claims the benefit of U.S. Ser. No. 60/522,522 filed Oct. 8, 2004.

BACKGROUND OF THE INVENTION

The present invention relates generally to welding systems and, more particularly, to stick welder configured to deliver an arc creation output for a predefined period of time after an electrode strikes a workpiece and if an arc is not formed during that time period, then automatically deliver a low open circuit voltage (OCV) at a reduced current capability. The stick welder compares a sense voltage to a threshold and, based on that comparison, temporarily adjusts its output from a low OCV level to an arc creation level to provide a boosted output for arc creation between an electrode and a workpiece. After arc creation, the stick welder is designed to readjust its output to user-selected parameters, but if an arc is not timely formed, the stick welder lowers its output voltage from boosted level to the low OCV level at a lower current capability.

One common type of welding-type process is a stick or shielded metal arc welding (SMAW) process. During this process an electrode (stick/rod) comprising a wire core covered with a flux coating is used to deliver a welding arc. For a given SMAW process, it is desirable to control the power supply output to provide a desired voltage/amperage (V/A) curve. Typically, the desired power supply output V/A curve includes a substantially constant current portion within a typical operating voltage range and a "droop" portion where current decreases as voltage increases. Additionally, many welding-type devices provide a "dig" portion where the current increases as voltage decreases for a lower than normal operational voltage range.

To initiate an SMAW welding-type process, some welding-type devices rely upon a relatively low open circuit voltage (OCV) at a low current capability to facilitate arc creation between an electrode and a workpiece. With these devices, a relatively low OCV is maintained across the devices' output terminals until an arc is formed between an electrode and workpiece. Once an arc is formed, the welding-type device will adjust is output to match user-desired voltage and current levels. While it is desirable to have a relatively low OCV and current capability when not welding, the OCV and low current capability may be insufficient to initiate an arc between the electrode and workpiece. Accordingly, other SMAW systems are designed to provide a "boosted" output, called a hot start. In this regard, a boosted output voltage with a higher current capability is available to create an arc between an electrode and a workpiece. Generally, when a short circuit condition is detected between an electrode and workpiece, the SMAW system will adjust operation such that a voltage available for arc formation exceeds the low, stand-by OCV that is generally present before arc creation and that the higher OCV is available with greater current capability. The arc creation parameters are then maintained until an arc is formed between the electrode and workpiece, and a brief period thereafter. Notwithstanding the improved ease in arc formation, such known hot start systems do have drawbacks.

For example, the increased OCV with greater current capability will remain available until an arc is formed. This elevated voltage level is transmitted across a weld cable connecting the power source and the electrode of the SMAW system. The weld cable, however, can become damaged at a worksite and when carrying an elevated OCV, an unwanted arc can form between an exposed portion of the cable and an unexpectant ground.

It would therefore be desirable to have a stick welder capable of providing arc creation parameters for a short period of time to facilitate quick and repeatable arc formation between an electrode and a workpiece and if an arc is not timely formed, automatically adjust operation of the stick welder to a stand-by mode of operation where a relatively low OCV with a low current capability is applied to the output terminals of the stick welder.

BRIEF DESCRIPTION OF THE INVENTION

The present invention is directed to stick welder that provides an elevated arc creation output for a short period of time after a short is detected between an electrode and a workpiece to facilitate arc creation between the electrode and the workpiece that overcomes the aforementioned drawbacks. The stick welder is constructed to automatically increase its voltage output with an increased current capability after a short circuit is detected between the electrode and workpiece. This arc creation output will be maintained for a short period after detection of the short. If an arc is not timely formed, the stick welder automatically down-adjusts its output to a stand-by mode of operation defined by a relatively low OCV with low current capability.

Therefore, in accordance with one aspect, the present invention includes a method of initiating an arc that includes comparing voltage across output terminals of a stick welder to a voltage threshold, and if the voltage across the output terminals is less than the voltage threshold, increasing the voltage across the output terminals from an OCV to an arc creation voltage that exceeds the OCV to create an arc between an electrode and a workpiece. The method further includes the steps of determining if an arc has been created between the electrode and the workpiece within a given time period and if not, adjusting the voltage across the output terminals to the OCV.

In accordance with another aspect, the present invention includes an apparatus for welding having a stick welder and an electrode operationally connected to the stick welder. A controller is disposed in the stick welder and is configured to set the stick welder to a pre-welding state upon powering-up of the stick welder. The stick welder is configured to provide an OCV when in the pre-welding state. The controller is further configured to detect a short between the electrode and a workpiece and upon detection of the short, set the stick welder to an arc formation state. In the arc formation state, the stick welder is designed to deliver an arc formation voltage that exceeds the OCV. The controller is also designed to monitor voltage output of the stick welder for a defined period of time and if an arc is not created between the electrode and the workpiece before expiration of the defined period of time, return the stick welder to the pre-welding state.

According to another aspect, a controller for a stick welder is disclosed. The controller is configured to detect a short circuit between an electrode of the stick welder and a workpiece. The controller is further configured to increase the voltage output of the stick welder from an OCV to a boosted voltage if a short is detected. Thereafter, the controller initiates a countdown timer and if an arc is not formed between the electrode and the workpiece before expiration of the countdown timer, then decrease the voltage output of the stick welder to the OCV.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

As one skilled in the art will fully appreciate, the hereinafter description of a welding apparatus not only includes welders, but also includes any system that requires high power outputs, such as heating and cutting systems. Therefore, the present invention is equivalently applicable with welders, plasma cutters, induction heaters, aircraft ground power units, and the like. Reference to welding power, welding-type power, or welders generally, includes welding, cutting, heating power, or ground power for aircraft. Description of a welding apparatus illustrates just one embodiment in which the present invention may be implemented. The present invention is equivalently applicable with many high power systems, such as cutting and induction heating systems, aircraft ground power systems, and any similar systems.

Figure 1:
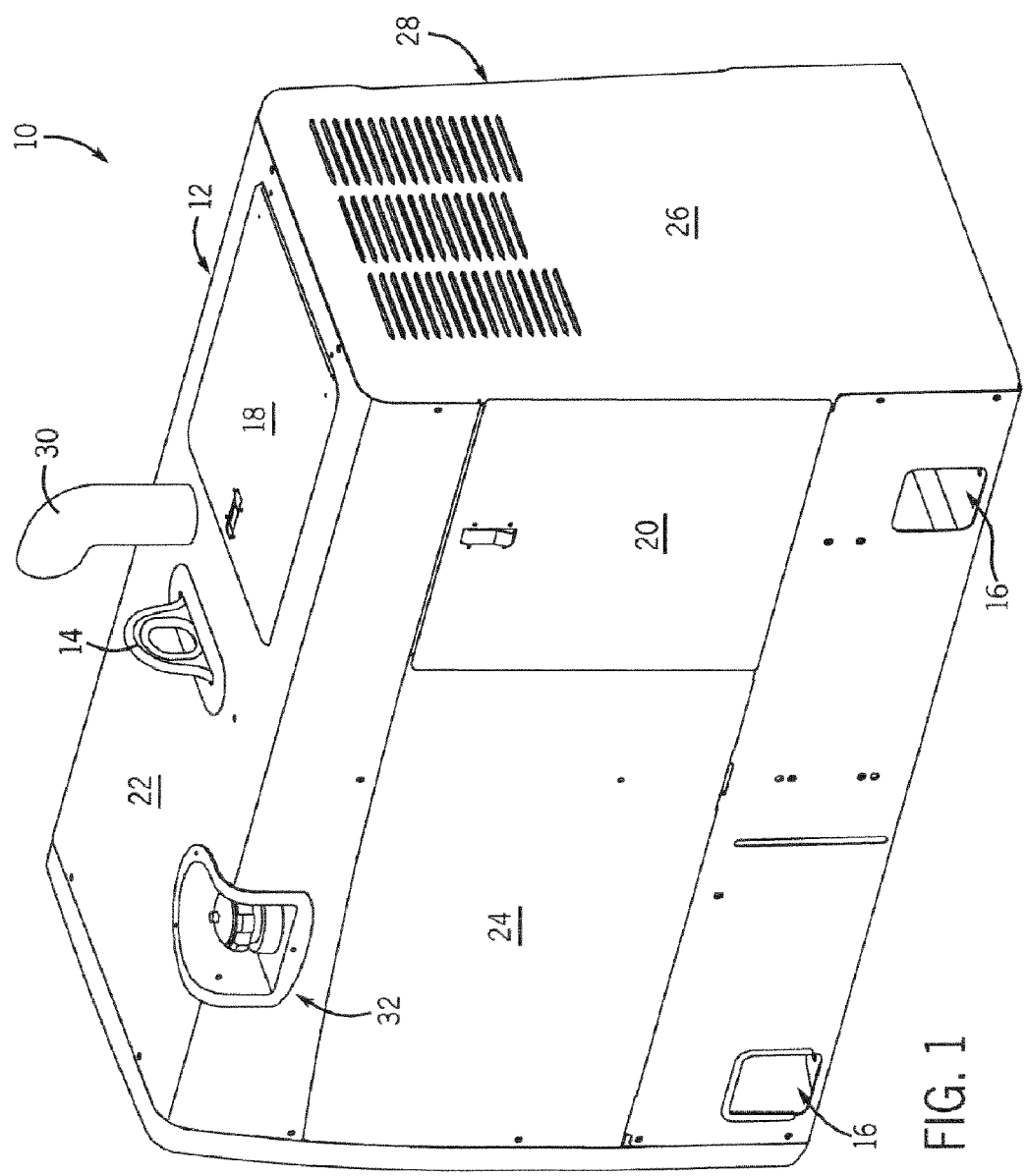
FIG. 1 is a perspective view of a stick welder incorporating the present invention.

FIG. 1 shows a stick welder 10. The stick welder 10 includes a housing 12 which encloses its internal components. Optionally, the stick welder 10 includes a loading eyehook 14 and/or fork recesses 16. The loading eyehook 14 and the fork recesses 16 facilitate the portability of the welding-type device 10. Optionally, the stick welder 10 could include a handle and/or wheels as a means of device mobility. The housing 12 also includes a plurality of access panels 18, 20. Access panel 18 is hinged to side panel 24 while access panel 20 is, in one embodiment, hinged to top panel 22. A similar access panel is available on an opposite side of the stick welder 10. These access panels 18, 20, provide access to the internal components of the stick welder, including a controller 25, shown in phantom and other processors designed to control operation of the stick welder. An end panel 26 includes a louvered opening 28 to allow for air flow through the housing 12. As is well known, the stick welder includes a contactor (not shown) that closes the welding circuit as well as a transformer boost circuit (not shown) designed to condition raw power received from an energy source or engine generated into a form usable for welding.

The housing 12 of the stick welder 10 may house an internal combustion engine. In this regard, an exhaust port 30 extends through top panel 22 and a fuel port 32 extends through an intersection of top panel 22 and side panel 24. The exhaust port 30 extends above the top panel 22 of the housing 12 and directs exhaust emissions away from the stick welder 10. The fuel port 32 preferably does not extend beyond the top panel 22 or side panel 24. Such a construction protects the fuel port 32 from damage during transportation and operation of the stick welder 10. One skilled in the art will appreciate that the present invention is applicable with non-engine driven stick welders.

Figure 2:
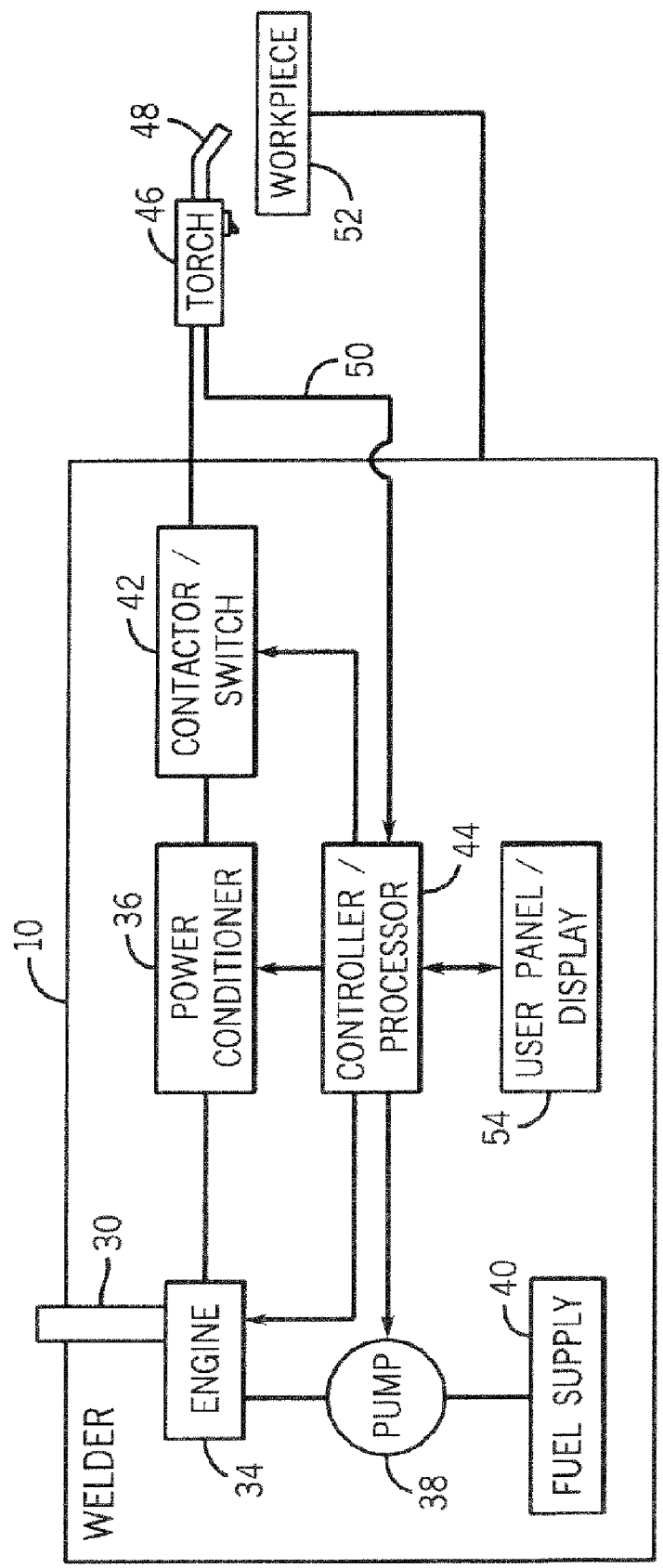
FIG. 2 is a schematic block diagram of a portion of a stick welder.

Referring now to FIG. 2, a schematic block diagram illustrates a stick welder such as that illustrated in FIG. 1. Specifically, welder 10 includes an engine designed to supply raw power to a power conditioner 36 that is designed to condition the raw power into a form usable during a welding-type process. The engine 34 is connected to a fuel pump 38 designed to provide fuel from fuel supply 40 during engine operation. One skilled in the art will appreciate, however, that the present invention is applicable with non-engine driven welders and, as such, the power conditioner may be connected to a utility line energy source rather than an engine. The output of power conditioner 36 is input to a contactor or switch assembly 42 that is selectively controlled by the welder controller or processor 44 to control the application of power to the torch 46 and ultimately electrode 48. In this regard, the controller 44 receives control signals across control cable 50 from the torch and, based on the control signals received, selectively activates/deactivates contactor 42. Specifically, when a trigger of torch 46 is depressed, the controller causes the contactor switch to close thereby closing the circuit between torch 46 and power conditioner 36. When the contactor switch is closed, a welding voltage is present between electrode 48 and workpiece 52 to support the welding process. Controller 44, as will be described in greater detail below, is designed to carry out a hot start process when initiating an arc between electrode 48 and workpiece 52. Once an arc has been created, the controller 44 controls the power supply to the weld based, in part, on user identified parameters input on a user panel/display 54. These parameters include dig and droop settings, voltage levels, and current levels. One skilled in the art will appreciate that welder 10 includes an additional circuitry and components now specifically illustrated in FIG. 2 for carrying and controlling a welding-type process. Further, in one embodiment, stick welder 10 is designed to provide an OCV of about 28V.

Figure 3:
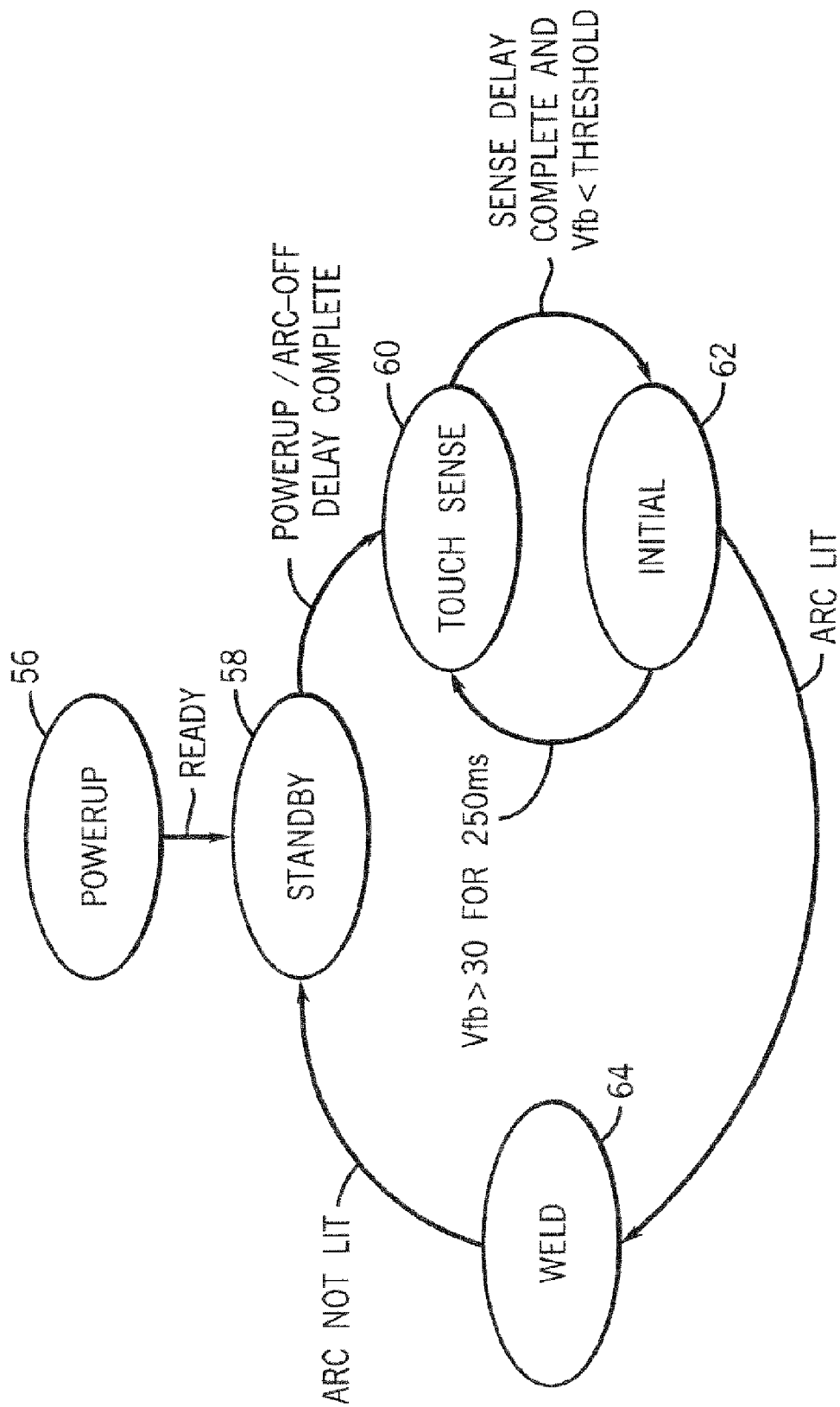
FIG. 3 is a state diagram illustrating a weld starting technique in accordance with the present invention.
Figure 4:
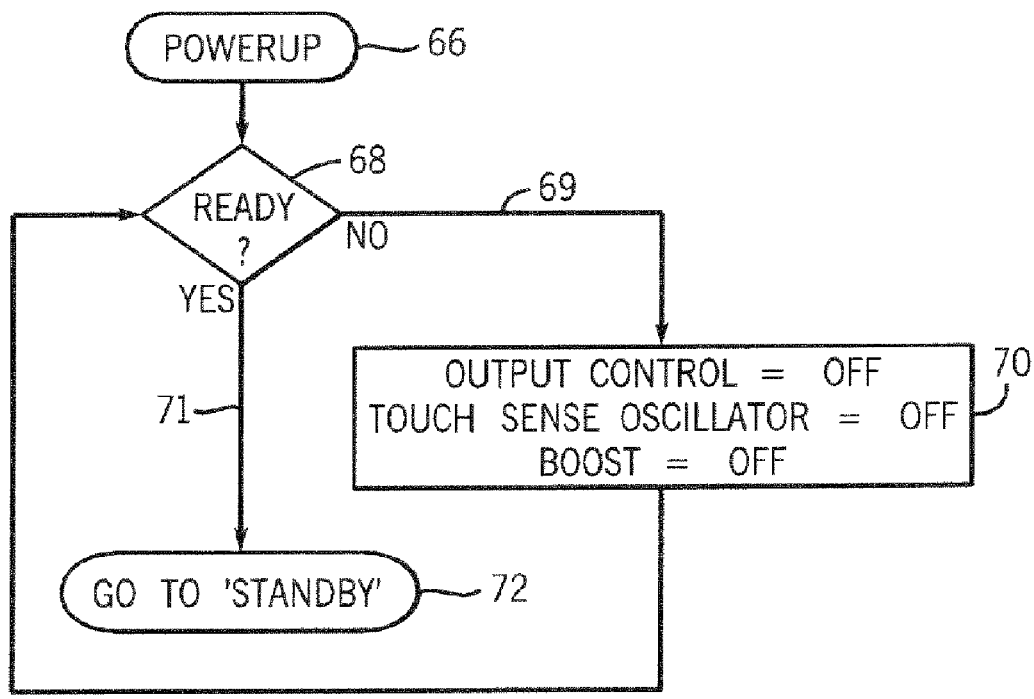
FIGS. 4-8 are flow charts setting forth a hot start technique in accordance with the present invention.

Referring now to FIG. 3, a state diagram illustrates the states a controller controls operation of stick welder 10. The stick welder 10 is initially entered into a POWER_UP state 56 in a conventional manner. At power-up, the contactor, boost circuitry and touch sense oscillator of the stick welder are disabled. After the stick welder has powered up, an arc start process timer is set to a given value, e.g. two seconds, and the stick welder is advanced to a STAND_BY state 58. In the STAND_BY state 58, after the process timer expires, the stick welder is driven to provide a relative low OCV output with a low current capability, the process time is reset to a new value, e.g. 250 μs, and the stick welder enters a TOUCH_SENSE state 60.

In the TOUCH_SENSE state 60, the controller preferably provides the relatively low OCV with low current capability. However, as will be described, the controller will vary those parameters when a short is detected between the electrode and the workpiece. Additionally, in the TOUCH_SENSE state, an oscillator designed to sense touching of the electrode and the workpiece is enabled. In TOUCH_SENSE state 60, the controller monitors the process timer and after the timer has expired, e.g. sense delay complete, monitors voltage across the stick welder's output terminals. The process timer is used to allow sufficient time for the oscillator to warm-up. If the voltage across the output terminals exceeds a threshold, the stick welder is driven to provide an arc formation output and advanced to an INITIAL state 62.

In the INITIAL state 62, the stick welder is driven to a boosted OCV with a high current capability to facilitate arc creation and if the output voltage of the stick welder is greater than a given value, e.g. thirty volts, the process timer is reset to the value selected during the TOUCH_SENSE state. On the other hand, if the output voltage is less than the given value, the controller determines if a short circuit is present between the electrode and the workpiece. If so, the stick welder increases its voltage output as well as the current capability. In one embodiment, the current capability is raised to a level that is twice the user-desired weld current. The increased voltage and current output are designed to facilitate easy arc formation when the electrode is pulled away from the workpiece. If an arc is timely formed, the stick welder enters a WELD state 64. On the other hand, if the process timer expires before an arc is struck, the stick welder returns to TOUCH_SENSE state 60 and the voltage output is dropped to the relatively low OCV level at the reduced or low current capability. Simply, the output of the welder is returned to pre-short circuit detection levels.

When placed in the WELD state 64, the arc formation voltage and current parameters are maintained for a pre-set period of time, e.g. 130 ms, but the touch sense oscillator is disabled and boost circuitry is enabled. The boost circuitry is enabled so that the arc can be more easily maintained after arc creation. After the pre-set period of time passes and if the arc remains lit, the controller causes the stick welder to provide an output current consistent with the weld current input by the user. If the output voltage exceeds a given value, e.g. ninety volts, for a given period of time, e.g. 250 ms, the boost circuitry is disabled. Once the arc is extinguished, the stick welder returns to the STAND_BY state 58 with the boost circuitry disabled and the process timer reset to a given value, e.g. 100 ms, and the output voltage and current returned to the relatively low OCV level with low current capability.

Referring now to FIGS. 4-8, flow charts setting forth steps of an arc formation technique in accordance with the present invention will be described. The steps provided are consistent with those identified with the state diagram of FIG. 3.

The arc formation technique begins with the stick welder being placed in a POWER_UP state 66. In POWER_UP 66, the stick welder powers up in a conventional manner to provide initialization of the system. The stick welder will remain in the POWER_UP state, with the output control, touch sense oscillator, and boost circuitry disabled, until ready for operation 68-69. Once the system is ready 68, 71, the controller initiates a process timer and the stick welder goes to a STAND_BY state at 72.

Figure 5:
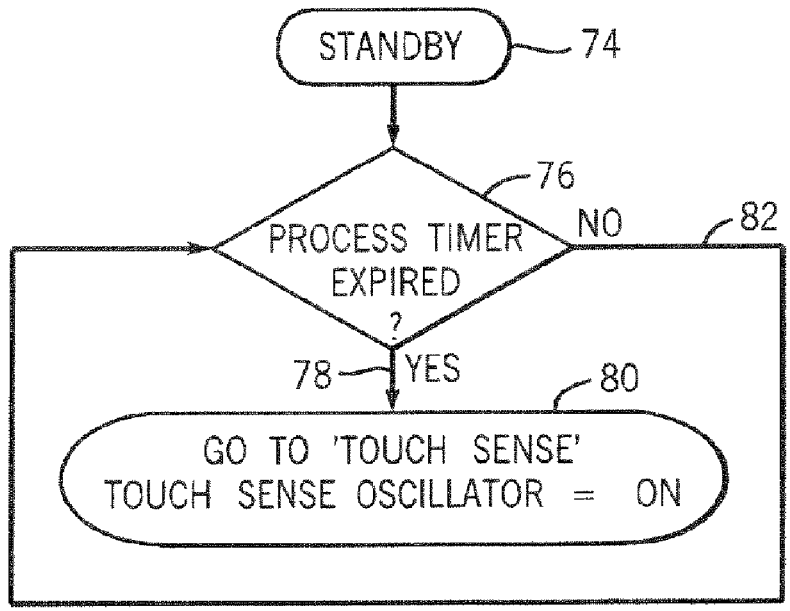

Referring now to FIG. 5, in STAND_BY state 74, the controller monitors the process timer 76. Once the process timer has expired 78, the controller causes the stick welder to go to a TOUCH_SENSE state at 80. In entering the TOUCH_SENSE state, the controller resets the process timer to 250 ms and the touch sense oscillator is enabled. If the process timer has not expired 76, 82, the process reloops to step 76 and waits until the timer expires.

Figure 6:
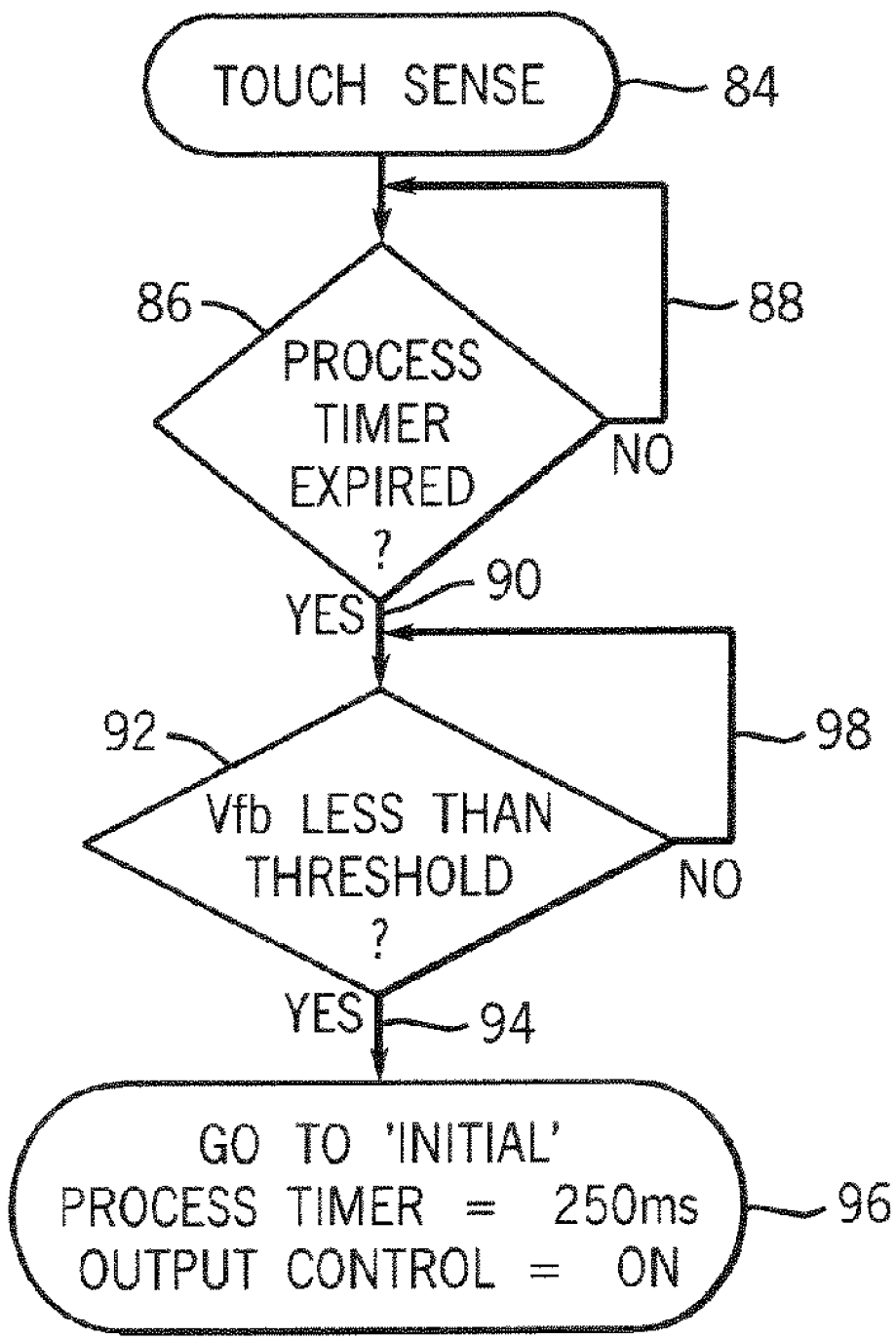

Referring now to FIG. 6, in the TOUCH_SENSE state 84, the controller monitors the process timer 86. If the process timer has not expired 86, 88, the controller loops back with continued monitoring of the timer. In this regard, once the timer has expired 86, 90, the controller monitors a sense voltage 92. If the sense voltage is less than a threshold 92, 94, the stick welder is caused to enable the main output control (providing output appropriate for arc formation) and enter an INITIAL state 96. Otherwise 92, 98, the technique idles and awaits a sense voltage less than the threshold. In this regard, the stick welder will not provide the arc formation output until a requisite sense voltage is determined.

Figure 7:
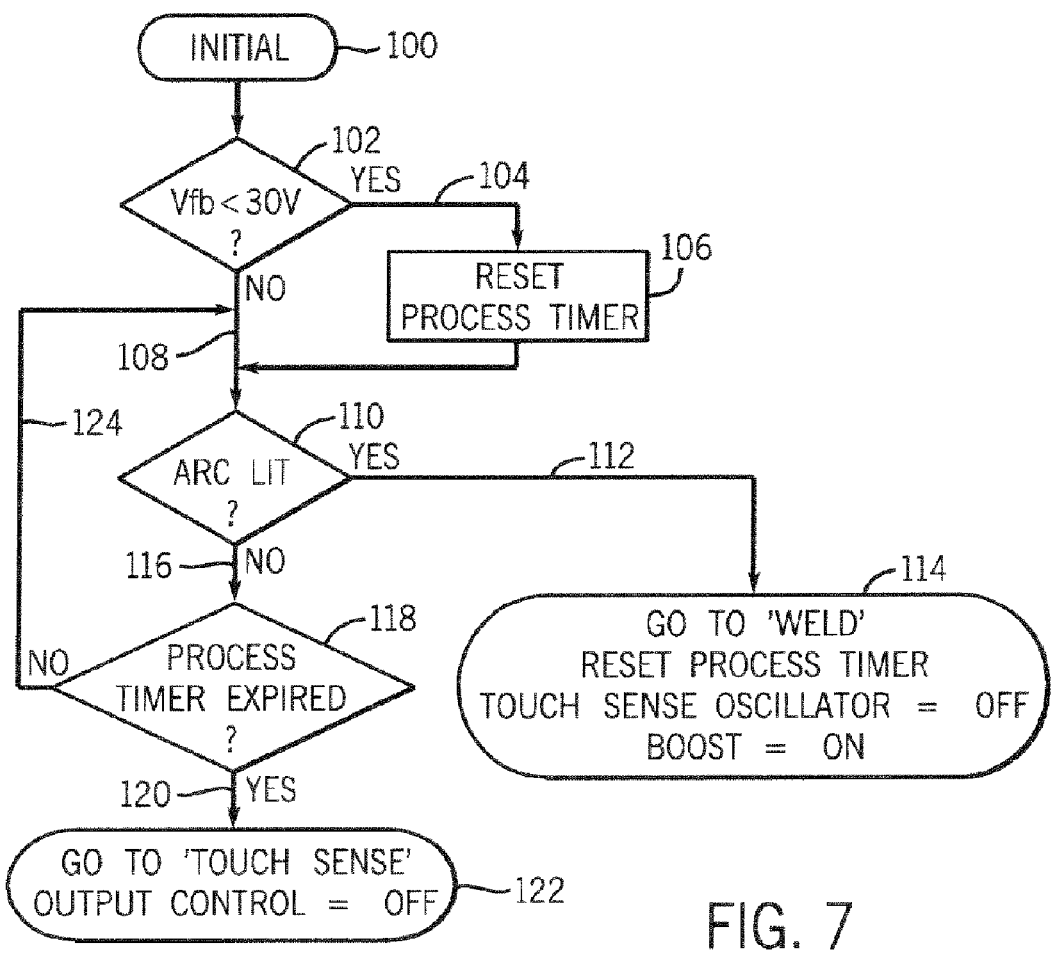

Referring now to FIG. 7, in the INITIAL state 100, the pre-arc formation or standby parameters are maintained 104. In this state 100, the controller compares the voltage across the output terminals of the stick welder to a weld threshold, e.g. thirty volts, at 102 to determine if the electrode and the workpiece have become in contact with one another. If so, the measured voltage across the output terminals will be less than the threshold 102, 104. If a short is detected, i.e., voltage less than threshold, the controller resets the process timer at 106 to, preferably, 250 ms. If the voltage sensed is not less than the 30V threshold 102, 108, the process immediately proceeds to step 110. Thereafter, the controller measures the voltage across the output terminals to determine if an arc has been formed between the electrode and the workpiece. That is, the controller determines if an arc has been formed between the electrode and workpiece 110. If so 110, 112, the stick welder enters a WELD state 114. If not 110, 116, the controller monitors the process timer 118. If the process timer expires before an arc is formed 118, 120, the stick welder is returned to the TOUCH_SENSE state at 122 and the output of the stick welder is reset to STAND_BY levels, i.e. relatively low OCV with low current capability. Otherwise, the process returns 124 to step 110.

Figure 8:
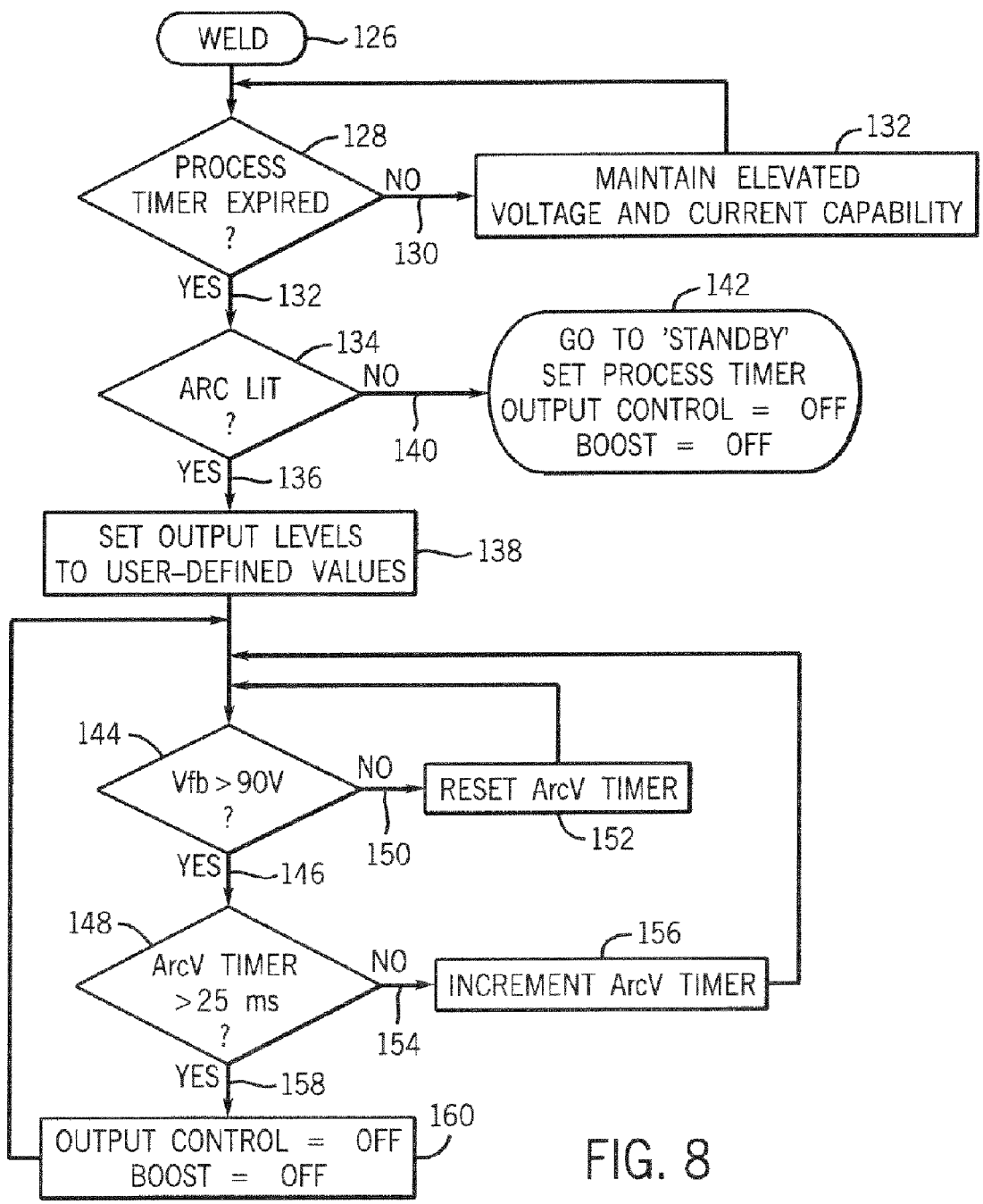

Referring now to FIG. 8, the steps of the WELD state portion of the arc formation technique are illustrated. When in the WELD state 126, the process timer is set to 130 ms, the touch sense oscillator is disabled, and the boost circuitry is enabled. As such, the controller monitors the process timer at 128. If the process timer has not expired 128, 130, the elevated voltage and current output is maintained 132, e.g. output current at twice user-selected weld current, 100 percent dig, and no droop. Once the timer has expired 128, 132, the controller determines if an arc is lit 134. If so 134, 136, the output current is set to match the weld current input by the user as is the dig setting 138. If an arc is not lit 134, 140, the stick welder is returned to the STAND_BY state at 146 whereupon the process timer is reset to 100 ms, the output control is disabled, the boost circuitry is disabled, the output voltage is returned to the relatively OCV level with a low current capability.

Following adjustment of stick welder output to the user-input parameters at 138, the controller again monitors voltage across the output terminals 144. If the voltage exceeds a maximum, e.g. ninety volts, 144, 146, an arc voltage timer is monitored at 148. On the other hand, if the voltage is below the maximum 144, 150, the arc voltage timer is reset to zero 152. As it is preferred that the stick welder not exceed a maximum voltage level for more than a pre-set period of time, e.g. 25 ms., the controller monitors the arc voltage timer at 148 when the arc voltage exceeds the maximum. If the arc voltage timer has not reached a maximum value 148, 154, the timer is incremented at 156 and the process returns to step 144. On the other hand 148, 158, if the arc voltage exceeds a maximum value for a given period of time, the output control and boost circuitry are disabled 150. The stick welder will maintain operation in this manner until the arc is extinguished or the arc voltage exceeds the maximum.

Therefore, the present invention includes a method of initiating an arc that includes comparing voltage across output terminals of a stick welder to a voltage threshold, and if the voltage across the output terminals is less than the voltage threshold, increasing the voltage across the output terminals from an OCV to an arc creation voltage that exceeds the OCV to create an arc between an electrode and a workpiece. The method further includes the steps of determining if an arc has been created between the electrode and the workpiece within a given time period and if not, adjusting the voltage across the output terminals to the OCV.

The present invention also includes an apparatus for welding having a stick welder and an electrode operationally connected to the stick welder. A controller is disposed in the stick welder and is configured to set the stick welder to a pre-welding state upon powering-up of the stick welder. The stick welder is configured to provide an OCV when in the pre-welding state. The controller is further configured to detect a short between the electrode and a workpiece and upon detection of the short, set the stick welder to an arc formation state. In the arc formation state, the stick welder is designed to deliver an arc formation voltage that exceeds the OCV. The controller is also designed to monitor voltage output of the stick welder for a defined period of time and if an arc is not created between the electrode and the workpiece before expiration of the defined period of time, return the stick welder to the pre-welding state.

A controller for a stick welder is also disclosed. The controller is configured to detect a short circuit between an electrode of the stick welder and a workpiece. The controller is further configured to increase the voltage output of the stick welder from an OCV to an arc formation voltage if a short is detected. Thereafter, the controller initiates a countdown timer and if an arc is not formed between the electrode and the workpiece before expiration of the countdown timer, then decrease the voltage output of the stick welder to the OCV.

The present invention has been described in terms of the preferred embodiment, and it is recognized that equivalents, alternatives, and modifications, aside from those expressly stated, are possible and within the scope of the appending claims.

What is claimed is:

1. A welding apparatus comprising:
   a stick welder;
   an electrode operationally connected to the stick welder; and
   a controller disposed in the stick welder and configured to:
   set the stick welder to a pre-welding state upon powering-up of the stick welder, the stick welder configured to provide an open circuit voltage when in the pre-welding state;
   detect a short between the electrode and a workpiece;
   upon detection of the short between the electrode and the workpiece, set the stick welder to an arc formation state, the stick welder configured to deliver an arc formation voltage that exceeds the open circuit voltage when in the arc formation state;
   monitor a voltage output of the stick welder for a defined period of time that begins upon the detection of the short between the electrode and the workpiece;
   detect whether an arc is created between the electrode and the workpiece before expiration of the defined period of time;
   upon detection that the arc is not created between the electrode and the workpiece, return the stick welder to the pre-welding state and cause the stick welder to provide the open circuit voltage at a level substantially less than the arc formation voltage; and in response to detection that the arc is created between the electrode and the workpiece, reduce a current capability of the stick welder to a user-desired weld current that has a magnitude less than that present during arc formation.

2. The welding apparatus of claim 1 wherein the controller is further configured to read the user-desired weld current from a control panel of the stick welder.

3. The welding apparatus of claim 1 wherein the controller is further configured to set a droop setting to a minimum level and a dig setting to a maximum setting when the stick welder is in the arc formation state.

4. The welding apparatus of claim 1 wherein the controller is configured to cause the stick welder to provide the arc formation voltage with a current capability that is two times the user-desired weld current when the stick welder is in the arc formation state.

5. The welding apparatus of claim 4 wherein the controller is further configured to cause the stick welder to provide the arc formation voltage with the current capability that is two times the user-desired weld current until either expiration of the defined period of time or formation of an arc between the electrode and the workpiece, wherein the defined period of time is set by a countdown timer.

6. A controller configured to:
   detect a short circuit between an electrode of a stick welder and a workpiece;
   upon detection of the short circuit increase a voltage output of the stick welder from an open circuit voltage to a boosted voltage;
   initiate a countdown timer when the short circuit is detected;
   detect whether an arc is formed between the electrode and the workpiece before expiration of the countdown timer;
   upon detection that the arc is not formed between the electrode and the workpiece, decrease the voltage output of the stick welder from the boosted voltage to the open circuit voltage; and upon detection that the arc is formed between the electrode and the workpiece, reduce a current capability of the stick welder to a user-desired weld current that has a magnitude less than that present during arc formation.

7. The controller of claim 6 further comprising the step of initially placing the stick welder in a standby state following stick welder power-up and reading user-input values from a control panel of the stick welder when in the standby state.

8. The controller of claim 6 wherein the stick welder is configured to provide the open circuit voltage of about 28V.

9. The controller of claim 6 further configured to decrease the output of the stick welder if the voltage across output terminals of the stick welder during an active weld event exceeds a threshold for a given period of time.

10. The controller of claim 6 wherein the controller is further configured to control the stick welder to provide an output with a current capability that is two times user-desired weld current.

11. The controller of claim 10 further configured to cause the stick welder to maintain delivery of the output with the current capability that is two times the user-desired weld current for a predefined time period following formation of an arc between the electrode and the workpiece.

12. The controller of claim 10 wherein the controller is further configured to initialize the countdown timer to a value of 250 ms when the short circuit is detected.

* * * * *